(12) United States Patent  
Rosenbluth et al.

(10) Patent No.: US 7,487,505 B2  
(45) Date of Patent: Feb. 3, 2009

(54) MULTITHREADED MICROPROCESSOR WITH REGISTER ALLOCATION BASED ON NUMBER OF ACTIVE THREADS

(75) Inventors: Mark B. Rosenbluth, Uxbridge, MA (US); Gilbert Wolrich, Framingham, MA (US); Debra Bernstein, Sudbury, MA (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 10/212,945

(22) Filed: Aug. 5, 2002

(65) Prior Publication Data

US 2003/0041228 A1   Feb. 27, 2003

Related U.S. Application Data

(60) Provisional application No. 60/315,144, filed on Aug. 27, 2001.

(51) Int. Cl.
| | |
|---|---|
| G06F 9/46 | (2006.01) |
| G06F 15/00 | (2006.01) |
| G06F 15/76 | (2006.01) |
| G06F 7/38 | (2006.01) |
| G06F 9/00 | (2006.01) |
| G06F 9/44 | (2006.01) |
| G06F 12/00 | (2006.01) |
| G06F 12/02 | (2006.01) |

(52) U.S. Cl. ............................ 718/104; 712/1; 712/220; 711/1

(58) Field of Classification Search ............... 712/23, 712/220, 1; 718/102, 104, 107–108; 711/1–6
See application file for complete search history.

(56) References Cited

U.S. PATENT DOCUMENTS

| | | |
|---|---|---|
| 3,373,408 A | 3/1968 | Ling |
| 3,478,322 A | 11/1969 | Evans |
| 3,792,441 A | 2/1974 | Wymore et al. |
| 3,881,173 A | 4/1975 | Larsen et al. |
| 3,913,074 A | 10/1975 | Homberg et al. |
| 3,940,745 A | 2/1976 | Sajeva |
| 4,023,023 A | 5/1977 | Bourrez et al. |
| 4,045,782 A | 8/1977 | Anderson et al. |
| 4,130,890 A | 12/1978 | Adam |
| 4,189,767 A | 2/1980 | Ahuja |
| 4,392,758 A | 7/1983 | Bowles et al. |

(Continued)

FOREIGN PATENT DOCUMENTS

EP    0 379 709    8/1990

(Continued)

OTHER PUBLICATIONS

Lo et al., "Software-Directed Register Deallocation for Simultaneous Multithreaded Processors," Sep. 1999, University of Washington Technical Report, pp. 1-17.*

(Continued)

Primary Examiner—Meng-Ai An  
Assistant Examiner—Qing-Yuan Wu  
(74) Attorney, Agent, or Firm—Fish & Richardson P.C.

(57) ABSTRACT

A mechanism in a multithreaded processor to allocate resources based on configuration information indicating how many threads are in use.

21 Claims, 6 Drawing Sheets

U.S. PATENT DOCUMENTS

| | | |
|---|---|---|
| 4,400,770 A | 8/1983 | Chan et al. |
| 4,514,807 A | 4/1985 | Nogi |
| 4,523,272 A | 6/1985 | Fukunaga et al. |
| 4,569,016 A | 2/1986 | Hao et al. |
| 4,724,521 A | 2/1988 | Carron et al. |
| 4,742,451 A | 5/1988 | Bruckert et al. |
| 4,745,544 A | 5/1988 | Renner et al. |
| 4,777,587 A | 10/1988 | Case et al. |
| 4,833,657 A | 5/1989 | Tanaka |
| 4,866,664 A | 9/1989 | Burkhardt, Jr. et al. |
| 4,868,735 A | 9/1989 | Moller et al. |
| 4,992,934 A | 2/1991 | Portanova et al. |
| 5,008,808 A | 4/1991 | Fries et al. |
| 5,073,864 A | 12/1991 | Methvin et al. |
| 5,113,516 A | 5/1992 | Johnson |
| 5,140,685 A | 8/1992 | Sipple et al. |
| 5,142,676 A | 8/1992 | Fried et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,165,025 A | 11/1992 | Lass |
| 5,166,872 A | 11/1992 | Weaver et al. |
| 5,168,555 A | 12/1992 | Byers et al. |
| 5,173,897 A | 12/1992 | Schrodi et al. |
| 5,247,671 A | 9/1993 | Adkins et al. |
| 5,255,239 A | 10/1993 | Taborn et al. |
| 5,263,169 A | 11/1993 | Genusov et al. |
| 5,274,770 A | 12/1993 | Yeoh et al. |
| 5,347,648 A | 9/1994 | Stamm et al. |
| 5,357,617 A | 10/1994 | Davis et al. |
| 5,363,448 A | 11/1994 | Koopman, Jr. et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,428,809 A | 6/1995 | Coffin et al. |
| 5,432,918 A | 7/1995 | Stamm |
| 5,436,626 A | 7/1995 | Fijiwara |
| 5,442,756 A | 8/1995 | Grochowski et al. |
| 5,448,702 A | 9/1995 | Garcia, Jr. et al. |
| 5,450,351 A | 9/1995 | Heddes |
| 5,450,603 A | 9/1995 | Davies |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,481,683 A | 1/1996 | Karim |
| 5,487,159 A | 1/1996 | Byers et al. |
| 5,517,628 A | 5/1996 | Morrison et al. |
| 5,517,648 A | 5/1996 | Bertone et al. |
| 5,541,920 A | 7/1996 | Angle et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,574,939 A | 11/1996 | Keckler et al. |
| 5,592,622 A | 1/1997 | Isfeld et al. |
| 5,600,812 A | 2/1997 | Park |
| 5,606,676 A | 2/1997 | Grochowski et al. |
| 5,610,864 A | 3/1997 | Manning |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,640,538 A | 6/1997 | Dyer et al. |
| 5,644,623 A | 7/1997 | Gulledge |
| 5,649,109 A | 7/1997 | Griesmer et al. |
| 5,649,157 A | 7/1997 | Williams |
| 5,652,583 A | 7/1997 | Kang |
| 5,659,687 A | 8/1997 | Kim et al. |
| 5,659,722 A | 8/1997 | Blaner et al. |
| 5,680,641 A | 10/1997 | Sidman |
| 5,689,566 A | 11/1997 | Nguyen |
| 5,692,167 A | 11/1997 | Grochowski et al. |
| 5,699,537 A | 12/1997 | Sharangpani et al. |
| 5,701,435 A | 12/1997 | Chi |
| 5,717,760 A | 2/1998 | Satterfield |
| 5,717,898 A | 2/1998 | Kagan et al. |
| 5,721,870 A | 2/1998 | Matsumoto |
| 5,724,563 A | 3/1998 | Hasegawa |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,790,813 A | 8/1998 | Whittaker |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,799 A | 9/1998 | Zuravleff et al. |
| 5,812,839 A | 9/1998 | Hoyt et al. |
| 5,812,868 A | 9/1998 | Moyer et al. |
| 5,813,031 A | 9/1998 | Chou et al. |
| 5,815,714 A | 9/1998 | Shridhar et al. |
| 5,819,080 A | 10/1998 | Dutton et al. |
| 5,828,746 A | 10/1998 | Ardon |
| 5,828,863 A | 10/1998 | Barrett et al. |
| 5,829,033 A | 10/1998 | Hagersten et al. |
| 5,832,215 A | 11/1998 | Kato et al. |
| 5,832,258 A | 11/1998 | Kiuchi et al. |
| 5,835,755 A | 11/1998 | Stellwagen, Jr. |
| 5,835,928 A | 11/1998 | Auslander et al. |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,893,162 A | 4/1999 | Lau et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,951,679 A | 9/1999 | Anderson et al. |
| 5,958,031 A | 9/1999 | Kim |
| 5,961,628 A | 10/1999 | Nguyen et al. |
| 5,970,013 A | 10/1999 | Fischer et al. |
| 5,978,838 A | 11/1999 | Mohamed et al. |
| 5,978,874 A | 11/1999 | Singhal et al. |
| 5,983,274 A | 11/1999 | Hyder et al. |
| 5,996,068 A | 11/1999 | Dwyer, III et al. |
| 6,002,881 A | 12/1999 | York et al. |
| 6,009,505 A | 12/1999 | Thayer et al. |
| 6,009,515 A | 12/1999 | Steele, Jr. |
| 6,012,151 A | 1/2000 | Mano |

| Patent No. | Kind | Date | Inventor |
|---|---|---|---|
| 6,014,729 | A | 1/2000 | Lannan et al. |
| 6,023,742 | A | 2/2000 | Ebeling et al. |
| 6,029,170 | A | 2/2000 | Garger et al. |
| 6,029,228 | A | 2/2000 | Cai et al. |
| 6,047,334 | A | 4/2000 | Langendorf et al. |
| 6,058,168 | A | 5/2000 | Braband |
| 6,058,465 | A | 5/2000 | Nguyen |
| 6,067,585 | A | 5/2000 | Hoang |
| 6,070,231 | A | 5/2000 | Ottinger |
| 6,072,781 | A | 6/2000 | Feeney et al. |
| 6,073,215 | A | 6/2000 | Snyder |
| 6,076,129 | A | 6/2000 | Fenwick et al. |
| 6,076,158 | A | 6/2000 | Sites et al. |
| 6,079,008 | A | 6/2000 | Clery, III |
| 6,079,014 | A | 6/2000 | Papworth et al. |
| 6,085,215 | A | 7/2000 | Ramakrishnan et al. |
| 6,085,294 | A | 7/2000 | Van Doren et al. |
| 6,088,783 | A | 7/2000 | Morton |
| 6,092,127 | A | 7/2000 | Tausheck |
| 6,092,158 | A | 7/2000 | Harriman et al. |
| 6,092,175 | A * | 7/2000 | Levy et al. ............... 712/23 |
| 6,112,016 | A | 8/2000 | MacWilliams et al. |
| 6,115,811 | A | 9/2000 | Steele, Jr. |
| 6,134,665 | A | 10/2000 | Klein et al. |
| 6,141,348 | A | 10/2000 | Muntz |
| 6,141,689 | A | 10/2000 | Yasrebi |
| 6,141,765 | A | 10/2000 | Sherman |
| 6,144,669 | A | 11/2000 | Williams et al. |
| 6,145,054 | A | 11/2000 | Mehrotra et al. |
| 6,145,123 | A | 11/2000 | Torrey et al. |
| 6,157,955 | A | 12/2000 | Narad et al. |
| 6,160,562 | A | 12/2000 | Chin et al. |
| 6,173,349 | B1 | 1/2001 | Qureshi et al. |
| 6,182,177 | B1 | 1/2001 | Harriman |
| 6,195,676 | B1 | 2/2001 | Spix et al. |
| 6,199,133 | B1 | 3/2001 | Schnell |
| 6,201,807 | B1 | 3/2001 | Prasanna |
| 6,212,542 | B1 | 4/2001 | Kahle et al. |
| 6,212,602 | B1 | 4/2001 | Wicki et al. |
| 6,212,604 | B1 * | 4/2001 | Tremblay ............... 711/125 |
| 6,212,611 | B1 | 4/2001 | Nizar et al. |
| 6,216,220 | B1 | 4/2001 | Hwang |
| 6,223,207 | B1 | 4/2001 | Lucovsky et al. |
| 6,223,238 | B1 | 4/2001 | Meyer et al. |
| 6,223,277 | B1 | 4/2001 | Karguth |
| 6,223,279 | B1 | 4/2001 | Nishimura et al. |
| 6,230,119 | B1 | 5/2001 | Mitchell |
| 6,230,261 | B1 | 5/2001 | Henry et al. |
| 6,233,599 | B1 * | 5/2001 | Nation et al. ............ 718/102 |
| 6,247,025 | B1 | 6/2001 | Bacon |
| 6,247,040 | B1 | 6/2001 | Born et al. |
| 6,247,086 | B1 | 6/2001 | Allingham |
| 6,249,829 | B1 | 6/2001 | Bloks et al. |
| 6,256,713 | B1 | 7/2001 | Audityan et al. |
| 6,272,616 | B1 | 8/2001 | Fernando et al. |
| 6,275,505 | B1 | 8/2001 | O Loughlin et al. |
| 6,278,289 | B1 | 8/2001 | Guccione et al. |
| 6,279,113 | B1 | 8/2001 | Vaidya |
| 6,289,011 | B1 | 9/2001 | Seo et al. |
| 6,298,370 | B1 | 10/2001 | Tang et al. |
| 6,307,789 | B1 | 10/2001 | Wolrich et al. |
| 6,311,256 | B2 | 10/2001 | Halligan et al. |
| 6,324,624 | B1 | 11/2001 | Wolrich et al. |
| 6,345,334 | B1 | 2/2002 | Nakagawa et al. |
| 6,347,344 | B1 | 2/2002 | Baker et al. |
| 6,351,808 | B1 | 2/2002 | Joy et al. |
| 6,356,962 | B1 | 3/2002 | Kasper et al. |
| 6,357,016 | B1 * | 3/2002 | Rodgers et al. ............ 713/601 |
| 6,360,262 | B1 | 3/2002 | Guenthner et al. |
| 6,366,978 | B1 | 4/2002 | Middleton et al. |
| 6,373,848 | B1 | 4/2002 | Allison et al. |
| 6,378,124 | B1 | 4/2002 | Bates et al. |
| 6,381,668 | B1 | 4/2002 | Lunteren |
| 6,389,449 | B1 | 5/2002 | Nemirovsky et al. |
| 6,393,483 | B1 | 5/2002 | Latif et al. |
| 6,401,149 | B1 | 6/2002 | Dennin et al. |
| 6,408,325 | B1 | 6/2002 | Shaylor |
| 6,415,338 | B1 | 7/2002 | Habot |
| 6,426,940 | B1 | 7/2002 | Seo et al. |
| 6,427,196 | B1 | 7/2002 | Adiletta et al. |
| 6,430,626 | B1 | 8/2002 | Witkowski et al. |
| 6,430,646 | B1 | 8/2002 | Thusoo et al. |
| 6,434,145 | B1 | 8/2002 | Opsasnick et al. |
| 6,449,289 | B1 | 9/2002 | Quicksall |
| 6,457,078 | B1 | 9/2002 | Magro et al. |
| 6,463,072 | B1 | 10/2002 | Wolrich et al. |
| 6,480,943 | B1 | 11/2002 | Douglas et al. |
| 6,490,642 | B1 | 12/2002 | Thekkath et al. |
| 6,496,925 | B1 * | 12/2002 | Rodgers et al. ............ 712/244 |
| 6,505,229 | B1 | 1/2003 | Turner et al. |
| 6,505,281 | B1 | 1/2003 | Sherry |
| 6,513,089 | B1 | 1/2003 | Hofmann et al. |
| 6,523,108 | B1 | 2/2003 | James et al. |
| 6,529,999 | B1 | 3/2003 | Keller et al. |
| 6,532,509 | B1 | 3/2003 | Wolrich et al. |
| 6,539,439 | B1 | 3/2003 | Nguyen et al. |
| 6,552,826 | B2 | 4/2003 | Adler et al. |
| 6,560,667 | B1 | 5/2003 | Wolrich et al. |
| 6,570,877 | B1 | 5/2003 | Kloth et al. |
| 6,577,542 | B2 | 6/2003 | Wolrich et al. |
| 6,577,625 | B1 | 6/2003 | Chiou et al. |
| 6,581,124 | B1 | 6/2003 | Anand |
| 6,584,522 | B1 | 6/2003 | Wolrich et al. |
| 6,587,905 | B1 | 7/2003 | Correale et al. |
| 6,587,906 | B2 | 7/2003 | Wolrich et al. |
| 6,606,704 | B1 | 8/2003 | Adiletta et al. |
| 6,625,654 | B1 | 9/2003 | Wolrich et al. |
| 6,628,652 | B1 | 9/2003 | Chrin et al. |
| 6,629,237 | B2 | 9/2003 | Wolrich et al. |
| 6,631,430 | B1 | 10/2003 | Wolrich et al. |
| 6,631,462 | B1 | 10/2003 | Wolrich et al. |
| 6,633,938 | B1 | 10/2003 | Rowlands et al. |
| 6,643,726 | B1 | 11/2003 | Patkar et al. |
| 6,654,836 | B1 | 11/2003 | Misra et al. |
| 6,661,794 | B1 | 12/2003 | Wolrich et al. |
| 6,661,795 | B1 | 12/2003 | Adas et al. |
| 6,667,920 | B2 | 12/2003 | Wolrich et al. |
| 6,668,311 | B2 | 12/2003 | Hooper et al. |
| 6,668,317 | B1 | 12/2003 | Bernstein et al. |
| 6,671,761 | B2 | 12/2003 | Kim |
| 6,671,827 | B2 | 12/2003 | Guilford et al. |
| 6,678,248 | B1 | 1/2004 | Haddock et al. |
| 6,681,300 | B2 | 1/2004 | Wolrich et al. |
| 6,684,361 | B2 | 1/2004 | Tong et al. |
| 6,694,380 | B1 | 2/2004 | Wolrich et al. |
| 6,697,923 | B2 | 2/2004 | Chen et al. |
| 6,724,767 | B1 | 4/2004 | Chong et al. |
| 6,725,313 | B1 | 4/2004 | Wingard et al. |
| 6,728,845 | B2 | 4/2004 | Adiletta et al. |
| 6,738,831 | B2 | 5/2004 | Wolrich et al. |
| 6,754,662 | B1 | 6/2004 | Li |
| 6,754,795 | B2 | 6/2004 | Chen et al. |
| 6,781,992 | B1 | 8/2004 | Rana et al. |
| 6,785,843 | B1 | 8/2004 | McRae et al. |
| 6,823,399 | B2 | 11/2004 | Horiguchi et al. |
| 6,826,180 | B1 | 11/2004 | Bergantino et al. |
| 6,847,645 | B1 | 1/2005 | Potter et al. |
| 6,868,476 | B2 | 3/2005 | Rosenbluth et al. |
| 6,889,319 | B1 * | 5/2005 | Rodgers et al. ............ 712/228 |
| 6,941,438 | B2 | 9/2005 | Wolrich et al. |
| 6,958,973 | B1 | 10/2005 | Chen et al. |
| 7,028,118 | B2 | 4/2006 | Smith et al. |
| 7,051,329 | B1 * | 5/2006 | Boggs et al. ............... 718/104 |
| 7,089,379 | B1 | 8/2006 | Sharma et al. |
| 7,216,204 | B2 | 5/2007 | Rosenbluth et al. |
| 7,225,281 | B2 | 5/2007 | Rosenbluth et al. |

| | | | |
|---|---|---|---|
| 7,246,197 | B2 | 7/2007 | Rosenbluth et al. |
| 7,337,275 | B2 | 2/2008 | Wolrich et al. |
| 2001/0043614 | A1 | 11/2001 | Viswanadham et al. |
| 2002/0053017 | A1 | 5/2002 | Adiletta et al. |
| 2002/0056037 | A1 | 5/2002 | Wolrich et al. |
| 2003/0012198 | A1 | 1/2003 | Kaganoi et al. |
| 2003/0041216 | A1 | 2/2003 | Rosenbluth et al. |
| 2003/0046488 | A1 | 3/2003 | Rosenbluth et al. |
| 2003/0065862 | A1 | 4/2003 | Wyland |
| 2003/0078950 | A1 | 4/2003 | Abernathy et al. |
| 2003/0105899 | A1 | 6/2003 | Rosenbluth et al. |
| 2003/0145155 | A1 | 7/2003 | Wolrich et al. |
| 2003/0145159 | A1 | 7/2003 | Adiletta et al. |
| 2003/0191866 | A1 | 10/2003 | Wolrich et al. |
| 2004/0034743 | A1 | 2/2004 | Wolrich et al. |
| 2004/0039895 | A1 | 2/2004 | Wolrich et al. |
| 2004/0054880 | A1 | 3/2004 | Bernstein et al. |
| 2004/0071152 | A1 | 4/2004 | Wolrich et al. |
| 2004/0073728 | A1 | 4/2004 | Wolrich et al. |
| 2004/0073778 | A1 | 4/2004 | Adiletta et al. |
| 2004/0098496 | A1 | 5/2004 | Wolrich et al. |
| 2004/0109369 | A1 | 6/2004 | Wolrich et al. |
| 2004/0139290 | A1 | 7/2004 | Wolrich et al. |
| 2004/0205747 | A1 | 10/2004 | Bernstein et al. |
| 2005/0132132 | A1 | 6/2005 | Rosenbluth et al. |
| 2005/0185437 | A1 | 8/2005 | Wolrich et al. |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 809 180 | 11/1997 |
| EP | 0 953 897 | 11/1999 |
| EP | 1 191 445 | 3/2002 |
| GB | 2 344 665 | 6/2000 |
| JP | 59111533 | 6/1984 |
| WO | WO 94/15287 | 7/1994 |
| WO | WO 97/38372 | 10/1997 |
| WO | WO 00/33195 | 6/2000 |
| WO | WO 01/15718 | 3/2001 |
| WO | WO 01/16697 | 3/2001 |
| WO | WO 01/16698 | 3/2001 |
| WO | WO 01/16703 | 3/2001 |
| WO | WO 01/16713 | 3/2001 |
| WO | WO 01/16714 | 3/2001 |
| WO | WO 01/16715 | 3/2001 |
| WO | WO 01/16716 | 3/2001 |
| WO | WO 01/16718 | 3/2001 |
| WO | WO 01/16722 | 3/2001 |
| WO | WO 01/16758 | 3/2001 |
| WO | WO 01/16769 | 3/2001 |
| WO | WO 01/16770 | 3/2001 |
| WO | WO 01/16782 | 3/2001 |
| WO | WO 01/18646 | 3/2001 |
| WO | WO 01/19702 | 3/2001 |
| WO | WO 01/41530 | 6/2001 |
| WO | WO 01/48596 | 7/2001 |
| WO | WO 01/48599 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO0148599 A1 * | 7/2001 |

OTHER PUBLICATIONS

Mendelson A. et al., "Design Alternatives of Multithreaded Architecture", International Journal of Parallel Programming, Plenum Press, New York, vol. 27, No. 3, Jun. 1999, pp. 161-193.

Agarwal et al., "April: A Processor Architecture for Multiprocessing," Proceedings of the 17th Annual International Symposium on Computer Architecture, IEEE, pp. 104-114.

Byrd et al., "Multithread Processor Architectures," *IEEE Spectrum*, vol. 32, No. 8, New York, Aug. 1, 1995, pp. 38-46.

Chang et al., "A New Mechanism For Improving Branch Predictor Performance," IEEE, pp. 22-31 (1994).

Doyle et al., *Microsoft Press Computer Dictionary*, 2nd ed., Microsoft Press, Redmond, Washington, USA, 1994, p. 326.

Farkas et al., "The multicluster architecture: reducing cycle time through partitioning," IEEE, vol. 30, Dec. 1997, pp. 149-159.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5th Annual IEEE Symposium on Field-Programmable Custom Computing Machines, 1997.

Hennessy et al., "Computer Organization and Design: The Hardware/Software Interface," Morgan Kaufman Publishers, 1998, pp. 476-482.

Hyde, R., "Overview of Memory Management," *Byte*, vol. 13, No. 4, 1998, pp. 219-225.

Intel, "IA-64 Application Developer's Architecture Guide," Rev.1.0, May 1999, pp. 2-2, 4-29 to 4-31, 7-116 to 7-118 and c-21.

Keckler et al., "Exploiting fine grain thread level parallelism on the MIT multi-ALU processor," IEEE, Jun. 1998.

Litch et al., "StrongARMing Portable Communications," IEEE Micro, 1998, pp. 48-55.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28th Annual Hawaii International Conference on System Sciences, 1995, pp. 191-201.

Trimberger et al, "A time-multiplexed FPGA," Proceedings of the 5th Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wadler, "The Concatenate Vanishes," University of Glasgow, Dec. 1987 (revised Nov. 1989), pp. 1-7.

Wazlowski et al., "PRSIM-II computer and architecture," IEEE Proceedings, Workshop on FPGAs for Custom Computing Machines, 1993.

U.S. Appl. No. 09/473,571, filed Dec. 28, 1999, Wolrich et al.

U.S. Appl. No. 09/475,614, filed Dec. 30, 1999, Wolrich et al.

Paver et al., "Register Locking in Asynchronous Processor Computer Design: VLSI Processors," ICCD '92 Proceedings, IEEE 1992 International Conference, 1992, pp. 351-355.

Waldspurger et al., "Register Relocation: Flexible Contents for Multithreading," Proceedings of the 20th Annual International Symposium on Computer Architecture, 1993, pp. 120-130.

"Hart, Field Communications Protocol, Application Guide", 'Online! 1999, Hart Communication Foundation, Austin, TX, XP002219606, http://lhe-div.web.cern.ch/lhc-div/IAS/WS/WorldFip/Labo/appguide.pdf, 79 pages.

"Intel IXP1200 Network Processor Family", Hardware Reference Manual, 272 pages (Dec. 2001).

"IXP1200 Network Processor", Data Sheet, 144 pages (Mar. 2000).

*C-5 Network Processor Architecture Guide*, C-Port Corporation, Freescale Semiconductor, Inc., Part No. C5NPD0-AG/D, May 31, 2001, 642 pages.

Chang, Shu-Ping et al., "An Overview of the Pipelined Common Buffer Architecture (PCBA) for Memory Based Packet/Cell Switching System", *IEEE*, pp. 288-297 (1994).

Frazier, Gregory L. et al., "The Design and Implementation of a Multi-Queue Buffer For VLSI Communication Switches", *IEEE*, pp. 466-471 (1989).

Hennessy et al., "Computer Organization and Design: The Hardware/Software Interface," Morgan Kaufman Publishers, 1998, pp. 116-119, 181-182, 225-227, 466-470, 476-482, 510-519, 712.

Lin, Yu-Sheng et al., "Queue Management for Shared Buffer and Shared Multi-buffer ATM Switches", *IEEE*, pp. 688-695 (1996).

Romilly Bowden, "What is HART?," Romilly's Hart and Fieldbus Web Site, Online!, 1977, XP002219605, http://www.romilly.co.uk/whathart.htm.

* cited by examiner

FIG. 5

| No. of Threads | Thread # | GPR Reg. Nos. (Absolute) |
|---|---|---|
| 8 | 0 | 0-3 |
|   | 1 | 4-7 |
|   | 2 | 8-11 |
|   | 3 | 12-15 |
|   | 4 | 16-19 |
|   | 5 | 20-23 |
|   | 6 | 24-27 |
|   | 7 | 28-31 |
| 4 | 0 | 0-7 |
|   | 2 | 8-15 |
|   | 4 | 16-23 |
|   | 6 | 24-31 |

MULTITHREADED MICROPROCESSOR WITH REGISTER ALLOCATION BASED ON NUMBER OF ACTIVE THREADS

CROSS REFERENCE TO RELATED APPLICATIONS

This application claims priority from U.S. Provisional Patent Application Ser. No. 60/315,144, filed Aug. 27, 2001.

BACKGROUND

Typically, hardware implementations of multithreaded microprocessors provide for use by each thread a fixed number of resources, such as registers, program counters, and so forth. Depending on the amount of parallelism in an application program executing on the microprocessor, some of the threads may not be used. Consequently, the resources of the unused threads and, more specifically, the power and silicon area consumed by those resources, are wasted.

DESCRIPTION OF DRAWINGS

FIG. 5 shows a table of thread GPR allocations for eight "in use" threads and four "in use" threads.

DETAILED DESCRIPTION

Figure 1:
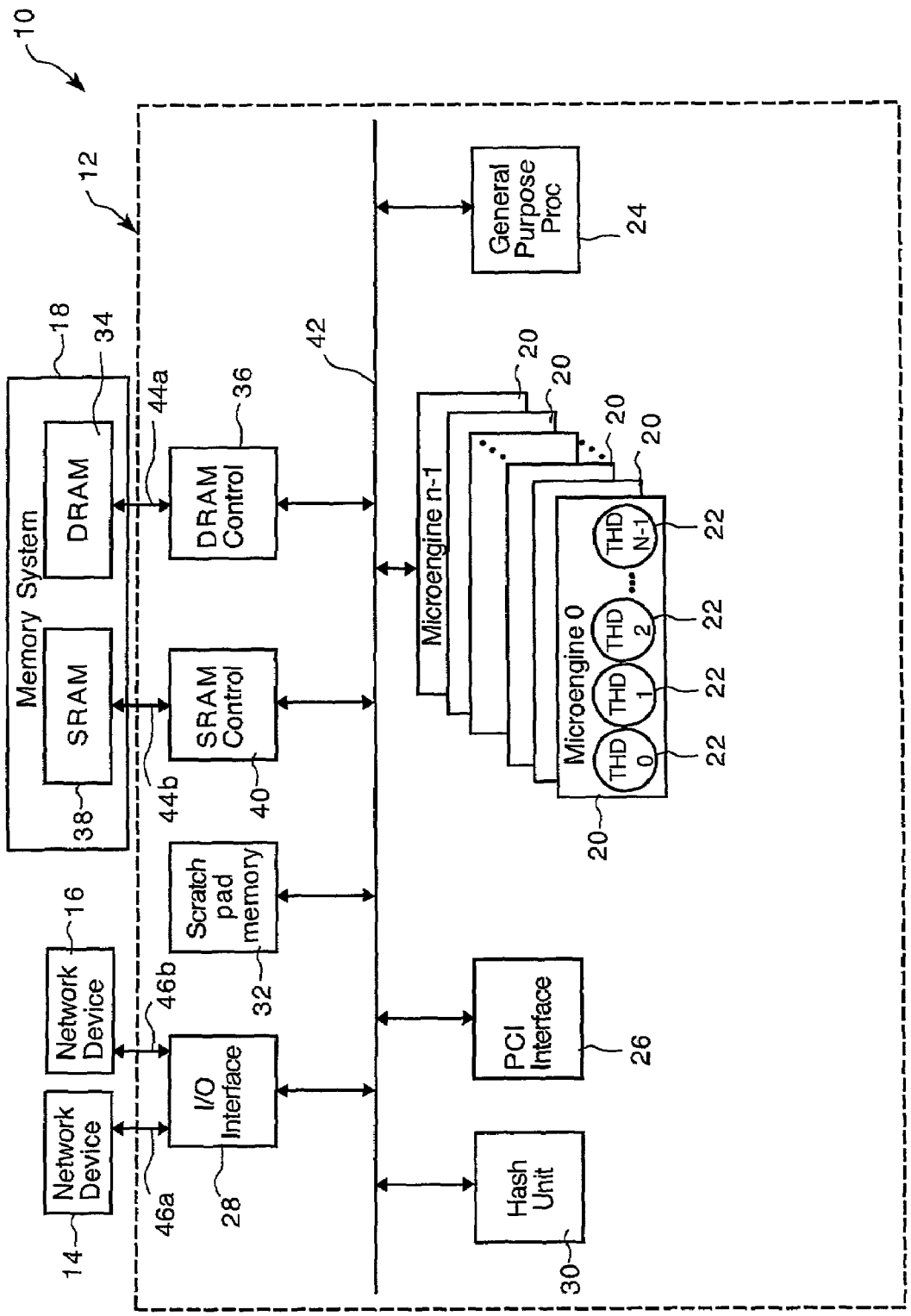
FIG. 1 shows a block diagram of a communication system employing a processor having multithreaded microengines to support multiple threads of execution.

Referring to FIG. 1, a communication system 10 includes a processor 12 coupled to one or more I/O devices, for example, network devices 14 and 16, as well as a memory system 18. The processor 12 is multi-threaded processor and, as such, is especially useful for tasks that can be broken into parallel subtasks or functions. In one embodiment, as shown in the figure, the processor 12 includes multiple microengines 20, each with multiple hardware controlled program threads 22 that can be simultaneously active and independently work on a task. In the example shown, there are "n" microengines 20, and each of the microengines 20 is capable of processing multiple program threads 22, as will be described more fully below. In the described embodiment, the maximum number "N" of context threads supported is eight, but other maximum amount could be provided. Preferably, each of the microengines 20 is connected to and can communicate with adjacent microengines.

The processor 12 also includes a processor 24 that assists in loading microcode control for other resources of the processor 12 and performs other general-purpose computer type functions such as handling protocols and exceptions. In network processing applications, the processor 24 can also provide support for higher layer network processing tasks that cannot be handled by the microengines 20. In one embodiment, the processor 24 is a StrongARM (ARM is a trademark of ARM Limited, United Kingdom) core based architecture. The processor (or core) 24 has an operating system through which the processor 24 can call functions to operate on the microengines 20. The processor 24 can use any supported operating system, preferably a real-time operating system. Other processor architectures may be used.

The microengines 20 each operate with shared resources including the memory system 18, a PCI bus interface 26, an I/O interface 28, a hash unit 30 and a scratchpad memory 32. The PCI bus interface 26 provides an interface to a PCI bus (not shown). The I/O interface 28 is responsible for controlling and interfacing the processor 12 to the network devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., processing of payloads from network packets. In a networking implementation, the SRAM 38 and SRAM controller 40 are used for low latency, fast access tasks, e.g., accessing look-up tables, memory for the processor 24, and so forth. The microengines 20 can execute memory reference instructions to either the DRAM controller 36 or the SRAM controller 40.

The devices 14 and 16 can be any network devices capable of transmitting and/or receiving network traffic data, such as framing/MAC devices, e.g., for connecting to 10/100BaseT Ethernet, Gigabit Ethernet, ATM or other types of networks, or devices for connecting to a switch fabric. For example, in one arrangement, the network device 14 could be an Ethernet MAC device (connected to an Ethernet network, not shown) that transmits packet data to the processor 12 and device 16 could be a switch fabric device that receives processed packet data from processor 12 for transmission onto a switch fabric. In such an implementation, that is, when handling traffic to be sent to a switch fabric, the processor 12 would be acting as an ingress network processor. Alternatively, the processor 12 could operate as an egress network processor, handling traffic that is received from a switch fabric (via device 16) and destined for another network device such as network device 14, or network coupled to such device. Although the processor 12 can operate in a standalone mode, supporting both traffic directions, it will be understood that, to achieve higher performance, it may be desirable to use two dedicated processors, one as an ingress processor and the other as an egress processor. The two dedicated processors would each be coupled to the devices 14 and 16. In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 includes separate receive and transmit blocks, each being separately configurable for a particular interface supported by the processor 12.

Other devices, such as a host computer and/or PCI peripherals (not shown), which may be coupled to a PCI bus controlled by the PC interface 26 are also serviced by the processor 12.

In general, as a network processor, the processor 12 can interface to any type of communication device or interface that receives/sends large amounts of data. The processor 12 functioning as a network processor could receive units of packet data from a network device like network device 14 and process those units of packet data in a parallel manner, as will be described. The unit of packet data could include an entire network packet (e.g., Ethernet packet) or a portion of such a packet, e.g., a cell or packet segment.

Each of the functional units of the processor 12 is coupled to an internal bus structure 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 2:
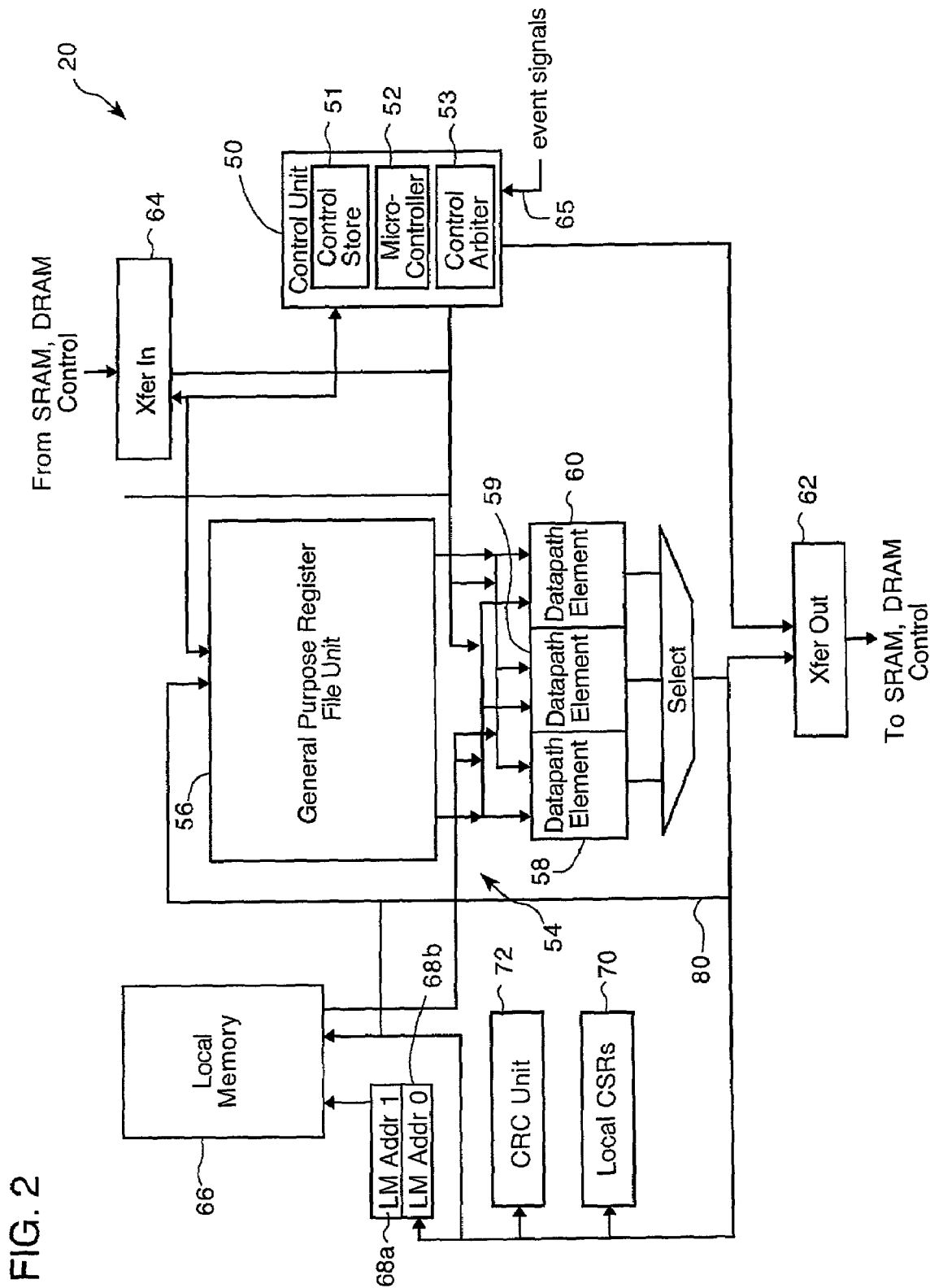
FIG. 2 shows a block diagram of the microengine (of FIG. 1).

Referring to FIG. 2, an exemplary one of the microengines 20 is shown. The microengine (ME) 20 includes a control unit 50 that includes a control store 51, control logic (or microcontroller) 52 and a context arbiter/event logic 53. The control store 51 is used to store a microprogram. The microprogram is loadable by the processor 24.

The microcontroller 52 includes an instruction decoder and program counter units for each of supported threads. The The context arbiter/event logic 53 receives messages (e.g., SRAM event response) from each one of the share resources, e.g., SRAM 38, DRAM 34, or processor core 24, and so forth. These messages provides information on whether a requested function has completed.

The context arbiter/event logic 53 has arbitration for the eight threads. In one embodiment, the arbitration is a round robin mechanism. However, other arbitration techniques, such as priority queuing or weighted fair queuing, could be used.

The microengine 20 also includes an execution datapath 54 and a general purpose register (GPR) file unit 56 that is coupled to the control unit 50. The datapath 54 includes several datapath elements, e.g., and as shown, a first datapath element 58, a second datapath element 59 and a third datapath element 60. The datapath elements can include, for example, an ALU and a multiplier. The GPR file unit 56 provides operands to the various datapath elements. The registers of the GPR file unit 56 are read and written exclusively under program control. GPRs, when used as a source in an instruction, supply operands to the datapath 54. When use as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The microengine 20 further includes a write transfer register file 62 and a read transfer register file 64. The write transfer register file 62 stores data to be written to a resource external to the microengine (for example, the DRAM memory or SRAM memory). The read transfer register file 64 is used for storing return data from a resource external to the microengine 20. Subsequent to or concurrent with the data arrival, event signals 65 from the respective shared resource, e.g., memory controllers 36, 40, or core 24, can be provided to alert the thread that requested the data that the data is available or has been sent. Both of the transfer register files 62, 64 are connected to the datapath 54, the GPR file unit 56, as well as the control unit 50.

Also included in the microengine 20 is a local memory 66. The local memory 66, which is addressed by registers 68a, 68b, also supplies operands to the datapath 54. The local memory 66 receives results from the datapath 54 as a destination. The microengine 20 also includes local control and status registers (CSRs) 70 for storing local inter-thread and global event signaling information, as well as other information, and a CRC unit 72, coupled to the transfer registers, which operates in parallel with the execution datapath 54 and performs CRC computations for ATM cells. The local CSRs 70 and the CRC unit 72 are coupled to the transfer registers, the datapath 54 and the GPR file unit 56.

In addition to providing an output to the write transfer unit 62, the datapath 54 can also provide an output to the GPR file 56 over line 80. Thus, each of the datapath elements can return a result value from an executed.

The functionality of the microengine threads 22 is determined by microcode loaded (via the core processor 24) for a particular user's application into each microengine's control store 51. For example, in one exemplary thread task assignment, one thread is assigned to serve as a receive scheduler thread and another as a transmit scheduler thread, a plurality of threads are configured as receive processing threads and transmit processing threads, and other thread task assignments include a transmit arbiter and one or more core communication threads. Once launched, a thread performs its function independently.

Figure 3:
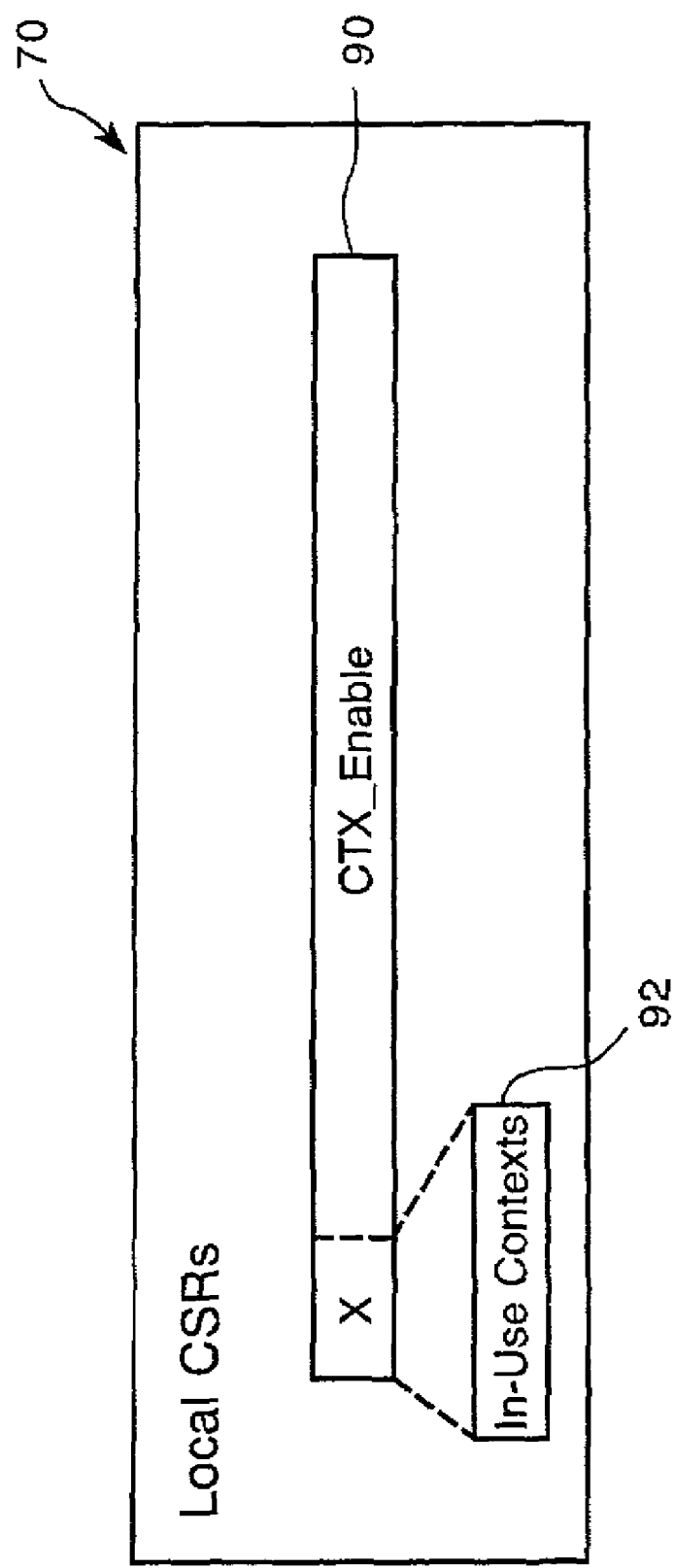
FIG. 3 shows a microengine Control and Status Register (CSR) used to select a number of "in use" threads.

Referring to FIG. 3, the CSRs 70 include a context enable register ("CTX_Enable") 90, which includes an "in use" contexts field 92 to indicate a pre-selected number of threads or contexts in use. The "in use" contexts field 92 stores a single bit, which when cleared (X=0) indicates all of the 8 available threads are in use, and which when set (X=1) indicates that only a predefined number, e.g., 4, more specifically, threads 0, 2, 4 and 6, are in use.

Figure 4:
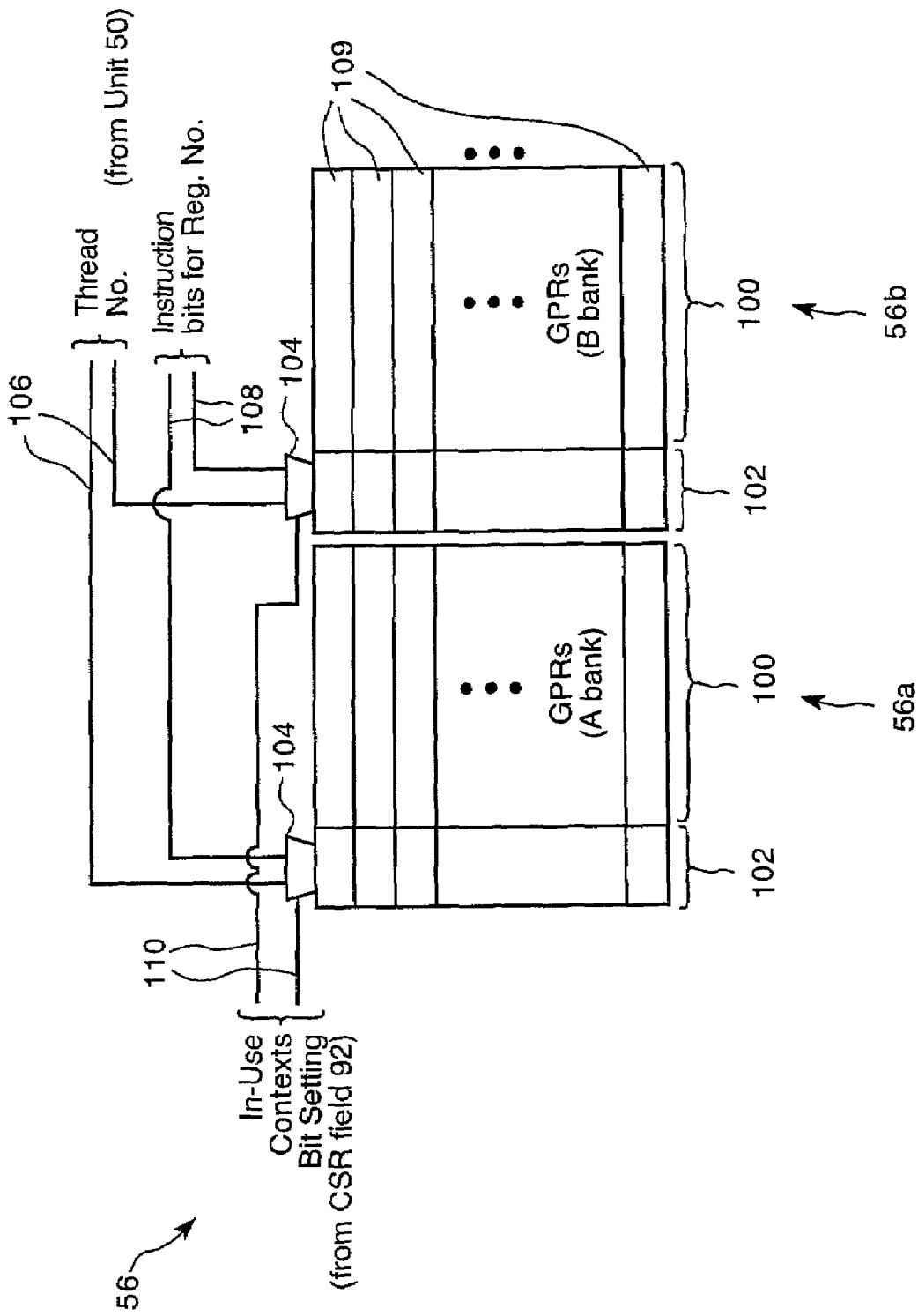
FIG. 4 shows a schematic diagram of a dual-bank implementation of a General Purpose Registers (GPR) file (of the microengine of FIG. 2) that uses a selected number of "in use" threads to allocate registers to threads.

As shown in FIG. 4, the GPRs of the GPR file unit 56 may be physically and logically contained in two banks, an A bank 56a and a B bank 56b. The GPRs in both banks include a data portion 100 and an address portion 102. Coupled to each register address path 102 is a multiplexor 104, which receives as inputs a thread number 104 and register number 106 (from the instruction) from the control unit 50. The output of the multiplexor 104, that is, the form of the "address" provided to the address path 102 to select one of the registers 109, is controlled by an enable signal 110. The state of the enable signal 110 is determined by the setting of the "In_Use" Contexts bit in the field 92 of the CTX_Enable register 90.

Conventionally, each thread has a fixed percentage of the registers allocated to it, for example, one-eighth for the case of eight threads supported. If some threads are not used, the registers dedicated for use by those unused threads go unused as well.

In contrast, the use of the multiplexor 104 controlled by "in use" contexts configuration information in the CTX_Enable CSR 90 enables a re-partitioning of the number of bits of active thread number/instruction (register number) bits in the register address and therefore a re-allocation of registers to threads. More specifically, when the bit in field 92 is equal to a "0", the number of "in use" threads is 8, and the enable 110 controls the multiplexor 104 to select all of the bits of the active thread number 106 and all but the most significant bit from the register number 108 specified by the current instruction. Conversely, when the bit in field 92 is set to a "1", the number of "in use" threads is reduced by half, and the number of registers available for allocation is redistributed so that the number of registers allocated per thread is doubled.

FIG. 5 shows the thread allocation for a register file of 32 registers. For 8 threads, thread numbers 0 through 7, each thread is allocated a total of four registers. For 4 threads, thread numbers 0, 2, 4 and 6, each thread is allocated a total of eight registers.

Figure 6A:
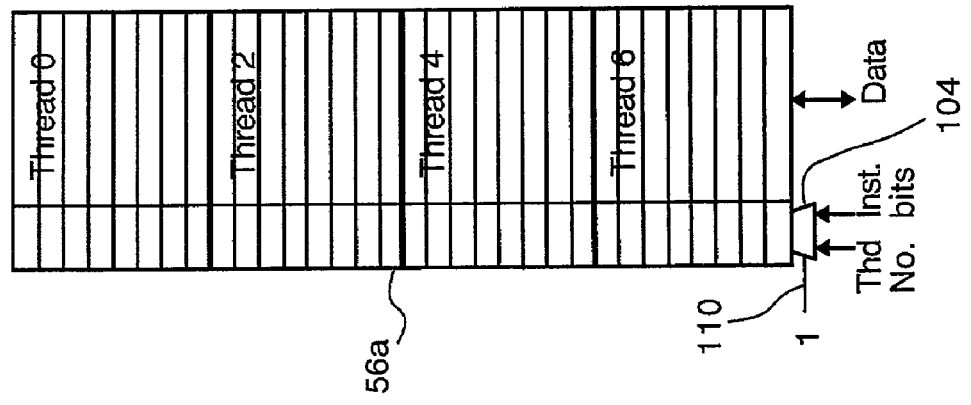
FIGS. 6A and 6B show the partition of registers in the GPR file in accordance with the thread GPR allocations for eight "in use" threads and four "in use" threads, respectively.
Figure 6B:
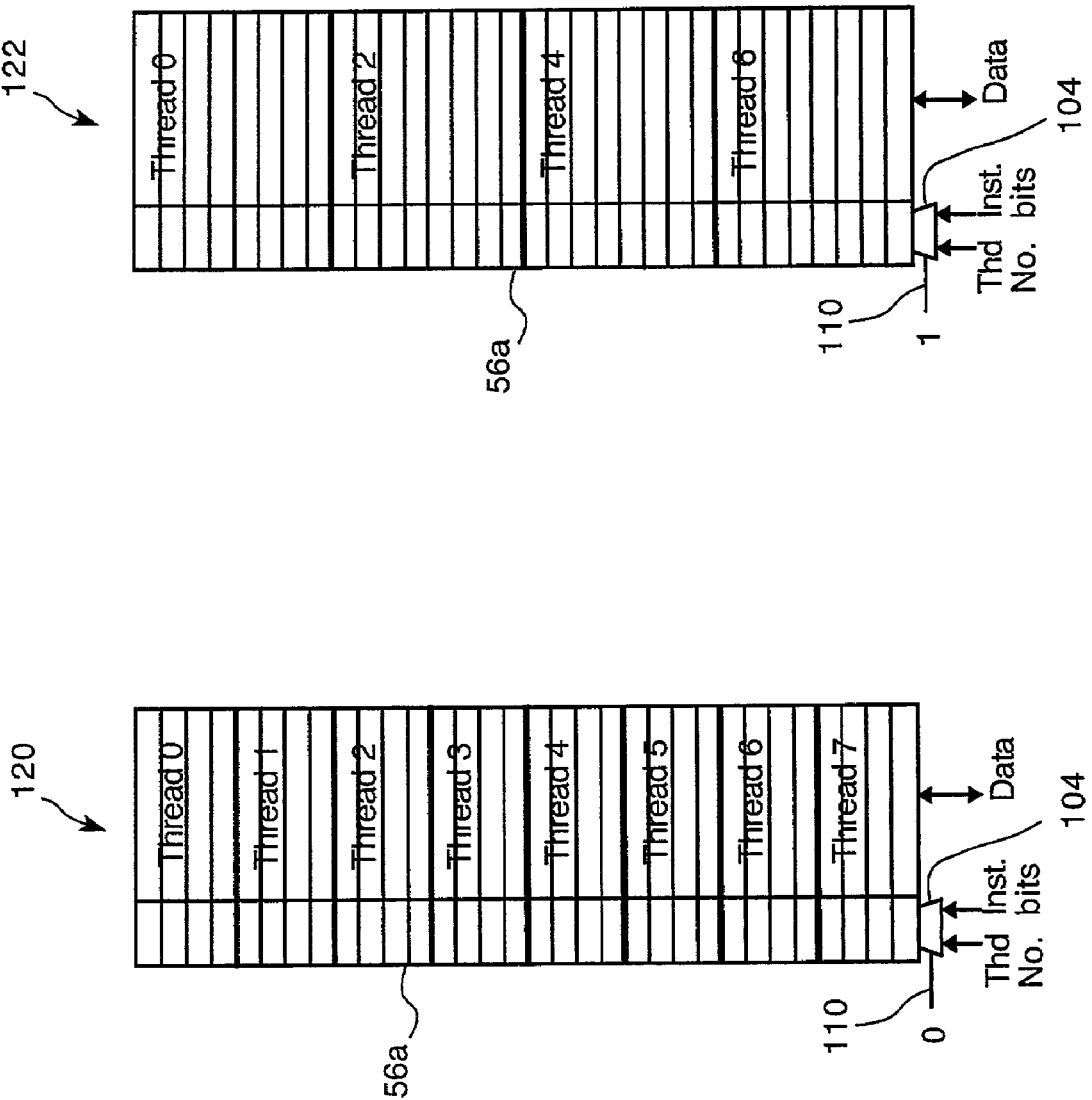

FIGS. 6A and 6B show a register file (single bank, for example, register file 56a) having 32 registers available for thread allocation and re-allocation among a maximum of eight supported threads. In an 8-thread configuration 120, that is, the case of eight threads in use, shown in FIG. 6A, each of the threads is allocated four registers. The multiplexor 104 selects all three bits of the binary representation of the thread number and all bits except the most significant bit (that is, selects two bits (bits 0 and 1)) of the binary representation of the register number from the instruction because the enable 110 is low. For a 4-thread configuration 122, that is, when enable 110 is high and thus four threads, as illustrated in FIG. 6B, each of the four threads is allocated eight registers. The multiplexor 104 selects all but the least significant bit (in this case, selects two bits, bits 1 and 2) of the binary representation of the thread number and selects all three bits (bits 0-2) of the binary representation of the register number from the instruction. Thus, the address into the register file is a concatenation of bits of the currently active thread number with bits of the register number from the instruction, and the contributing number of bits from each is determined by the setting of the In_Use contexts bit 92 in the CTX_Enable register 90 (from FIG. 3).

Thus, the GPRs are logically subdivided in equal regions such that each context has relative access to one of the regions. The number of regions is configured in the In_Use contexts field 92, and can be either 4 or 8. Thus, a context-relative register number is actually associated with multiple different physical registers. The actual register to be accessed is determined by the context making the access request, that is, the context number concatenated with the register number, in the manner described above. Context-relative addressing is a powerful feature that enables eight or four different threads to share the same code image, yet maintain separate data. Thus, instructions specify the context-relative address (register number). For eight active contexts, the instruction always specifies registers in the range of 0-3. For four active contexts, the instruction always specifies registers in the range of 0-7.

Referring back to the table shown in FIG. 4, the absolute GPR register number is the register number that is actually used by the register address path (decode logic) to access the specific context-relative register. For example, with 8 active contexts, context-relative thread 0 for context (or thread) 2 is 8.

The above thread GPR allocation scheme can be extended to different numbers of threads (based on multiples of 2) and registers, for example, re-allocating a total of 128 registers from among a maximum number of 8 "in use" threads (16 registers each) to 4 "in use" threads (32 registers each), or re-allocating a total of 128 registers from among a maximum number of 16 "in use" threads (8 registers each) to 8 "in use" threads (16 registers each).

Other embodiments are within the scope of the following claims.

What is claimed is:

1. A computer implemented method for dynamically partitioning registers to threads currently in use, the method comprising:
   determining a number of threads that are currently executing in a multithreaded processor, and storing an indication of said number of threads that are in use, as a context indication; and
   allocating a number of registers within said multithreaded processor based on said context indication, said allocating based on a first number of threads and a second number of threads greater than said first number of threads, and allocating such that for said first number of threads, the registers are grouped into a first grouping of registers with groups having a first number of registers per group, and for said second number of threads, the registers are grouped into a second grouping of registers, where said second grouping of registers has half the number of registers per group as compared with said first grouping of registers, but has double the number of groups as compared with said first grouping of registers.

2. The method of claim 1, wherein the storing comprises storing at least one configuration bit in a control and status register.

3. The method of claim 1, the allocating comprising allocating the number of registers in a general purpose register file which includes an address decode portion and a multiplexor coupled to the address decode portion, the multiplexor to receive a thread number and a register number as inputs and to select bits of the thread number and the register number based on the context indication to form an address corresponding to one of the registers.

4. The method of claim 3 wherein the context indication indicates selection of all but the least signification bit of the thread number and all bits of the register number.

5. The method of claim 3 wherein the context indication indicates selection of all but the most significant bit of the register number and all bits of the thread number.

6. The method of claim 3 wherein the selected bits of the register number form a thread-relative register number.

7. A method as in claim 1, wherein said storing uses a single-bit context field within a context enable register, and wherein the single-bit context field indicates, in a first state, that more than a preselected number of threads are in use and, in a second state, indicates that the number of threads in use is less than or equal to the preselected number of threads.

8. A processor configured to dynamically partition registers to threads currently in use, the processor comprising:
   a plurality of registers;
   a storage location, which stores an indication of a number of threads that are currently executing in the processor reflecting the number of threads that are in use; and
   a resource selector, which allocates said registers among said threads based on the indication of the number of threads that are in use, wherein said registers are grouped into X regions, each of the X regions having Y registers grouped therein, and when more than a preselected number of threads are in use, X is doubled and Y is halved.

9. The processor of claim 8, wherein the indication of the number of threads that are in use is a single bit, which in a first state indicates that more than the preselected number of threads are in use and in a second state indicates that the number of threads in use is less than or equal to the preselected number.

10. The processor of claim 9, further comprising a control and status register comprising the storage location.

11. The processor of claim 9, wherein the plurality of registers comprises a general purpose register file which includes an address decode portion, and the resource selector is a multiplexor coupled to the address decode portion, the multiplexor to receive a thread number and a register number as inputs and to select bits of the thread number and the register number based on the indication of the number of threads that are in use to form an address corresponding to one of the registers.

12. The processor of claim 11 wherein the indication of the number of threads that are in use indicates selection of all but the least signification bit of the thread number and all bits of the register number.

13. The processor of claim 11 wherein the indication of the number of threads that are in use indicates selection of all but the most significant bit of the register number and all bits of the thread number.

14. The processor of claim 11 wherein the selected bits of the register number form a thread-relative register number.

15. A system for dynamically partitioning registers to threads currently in use, the system comprising:
- a network device;
- a memory system; and
- a processor comprising:
- a plurality of registers,
- a storage location, which stores an indication of a number of threads that are currently executing in the processor reflecting the number of threads that are in use, and
- a resource selector, which allocates said registers among said threads based on the indication of the number of threads that are in use, wherein said registers are grouped into X regions, each of the X regions having Y registers grouped therein, and when more than a preselected number of threads are in use, X is doubled and Y is halved.

16. The system of claim 15, wherein the indication of the number of threads that are in use is a single bit, which in a first state indicates that more than the preselected number of threads are in use and in a second state indicates that the number of threads in use is less than or equal to the preselected number.

17. The system of claim 16, the processor further comprising a control and status register comprising the storage location.

18. The system of claim 16, wherein the plurality of registers comprises a general purpose register file which includes an address decode portion, and the resource selector is a multiplexor coupled to the address decode portion, the multiplexor to receive a thread number and a register number as inputs and to select bits of the thread number and the register number based on the indication of the number of threads that are in use to form an address corresponding to one of the registers.

19. The system of claim 18 wherein the indication of the number of threads that are in use indicates selection of all but the least signification bit of the thread number and all bits of the register number.

20. The system of claim 18 wherein the indication of the number of threads that are in use indicates selection of all but the most significant bit of the register number and all bits of the thread number.

21. The system of claim 18 wherein the selected bits of the register number form a thread-relative register number.

* * * * *